(12) United States Patent
Queren et al.

(10) Patent No.: US 11,199,756 B2
(45) Date of Patent: Dec. 14, 2021

(54) LIGHTING DEVICE AND METHOD FOR OPERATING A LIGHTING DEVICE

(71) Applicant: OSRAM Opto Semiconductors GmbH, Regensburg (DE)

(72) Inventors: Désirée Queren, Neutraubling (DE); Mikko Perälä, Tampere (FI); Marco Antretter, Parkstetten (DE)

(73) Assignee: OSRAM OLED GMBH, Regensburg (DE)

( * ) Notice: Subject to any disclaimer, the term of this patent is extended or adjusted under 35 U.S.C. 154(b) by 0 days.

(21) Appl. No.: 16/488,213

(22) PCT Filed: Feb. 22, 2018

(86) PCT No.: PCT/EP2018/054423
§ 371 (c)(1),
(2) Date: Aug. 22, 2019

(87) PCT Pub. No.: WO2018/154007
PCT Pub. Date: Aug. 30, 2018

(65) Prior Publication Data
US 2020/0120246 A1 Apr. 16, 2020

(30) Foreign Application Priority Data
Feb. 24, 2017 (DE) .......................... 102017103888.4

(51) Int. Cl.
*H04N 5/225* (2006.01)
*G03B 15/07* (2021.01)

(52) U.S. Cl.
CPC ........... *G03B 15/07* (2013.01); *H04N 5/2254* (2013.01); *H04N 5/2256* (2013.01)

(58) Field of Classification Search
CPC .......................... H04N 5/2254; H04N 5/2256
See application file for complete search history.

(56) References Cited

U.S. PATENT DOCUMENTS

2002/0185963 A1* 12/2002 Browning ............... H01J 9/242
313/495
2006/0002110 A1 1/2006 Dowling et al.
(Continued)

FOREIGN PATENT DOCUMENTS

DE 102010003653 A1 10/2011
DE 102017103882 A1 8/2018

OTHER PUBLICATIONS

Newsdog, "Here's how the dual-camera setup works on the Apple iPhone 7 Plus 2016," http://newsdog.today/a/article/57d12d0e76f3dfff3e6cf0b3, retrieved Oct. 10, 2017, pp. 1-5.
(Continued)

*Primary Examiner* — Kent W Chang
*Assistant Examiner* — Scott D Au
(74) *Attorney, Agent, or Firm* — Slater Matsil, LLP

(57) ABSTRACT

A lighting device and a method for operating a lighting device are disclosed. In an embodiment, a lighting device includes at least one semiconductor component comprising a plurality of pixels and configured to generate light illuminating a field of view and a drive circuit, wherein the field of view is divided into a plurality of regions, wherein each pixel is configured to illuminate a region of the field of view, wherein each pixel comprises at least a first type subpixel and a second type subpixel, and wherein the first type subpixel is configured to emit light of a white color location and the second type subpixel is configured to emit light of a non-white color location.

16 Claims, 5 Drawing Sheets

(56) References Cited

U.S. PATENT DOCUMENTS

| | | | |
|---|---|---|---|
| 2007/0080925 A1* | 4/2007 | Radivojevic | G02F 1/1524 |
| | | | 345/105 |
| 2012/0206050 A1 | 8/2012 | Spero | |
| 2012/0286238 A1 | 11/2012 | Linton et al. | |
| 2014/0028861 A1* | 1/2014 | Holz | H04N 5/357 |
| | | | 348/208.4 |
| 2015/0228231 A1* | 8/2015 | Kasegawa | G09G 3/3413 |
| | | | 345/694 |
| 2016/0210473 A1* | 7/2016 | Cohen | G06F 21/10 |
| 2016/0286619 A1 | 9/2016 | Roberts et al. | |
| 2016/0295088 A1 | 10/2016 | Umetsu | |

OTHER PUBLICATIONS

Selby, D., "Lighting Rumours—What is a True Tone flash?," News and reviews for photographic lighting users, http:/www.lightingrumours.com/what-is-true-tone-flash-iphone-5s-4657, Sep. 11, 2013, pp. 1-6.

* cited by examiner

LIGHTING DEVICE AND METHOD FOR OPERATING A LIGHTING DEVICE

This patent application is a national phase filing under section 371 of PCT/EP2018/054423, filed Feb. 22, 2018, which claims the priority of German patent application 102017103888.4, filed Feb. 24, 2017, each of which is incorporated herein by reference in its entirety.

TECHNICAL FIELD

A lighting device is specified. In addition, a method of operating a lighting device is specified.

SUMMARY OF THE INVENTION

Embodiments provide a lighting device with improved efficiency. Further embodiments provide a method for operating such a lighting device.

According to at least one embodiment, a lighting device with at least one semiconductor component provided for generating light is specified. For example, the semiconductor component has an active zone in which light is generated during normal operation of the semiconductor component. For example, the lighting device is a flash. In particular, during normal operation, in the semiconductor component light is generated in a wavelength range between infrared and UV radiation. For example, the semiconductor component has an emission surface through which a large part of the emitted light is emitted during normal operation.

According to at least one embodiment, the lighting device comprises a control circuit. The control circuit is electrically conductively connected to the semiconductor component and is configured to control and operate the semiconductor component. For example, the control circuit and the semiconductor component are mechanically firmly connected to each other via a cohesive connection. For example, the semiconductor component and the control circuit are connected to each other by means of a solder connection. The control circuit may, for example, be arranged on a side of the semiconductor component facing away from the emission surface.

According to at least one embodiment of the lighting device, light emitted during operation of the semiconductor component illuminates a field of view. For example, the lighting device includes a sensor, or the lighting device is part of a camera that includes a sensor. For example, the field of view is a region in an object space that is projected on the sensor. In particular, only the entire field of view is projected on the sensor. The field of view may be located between inclusive 1 m and 30 m, in particular between inclusive 0.5 m and 10 m, from the lighting device.

According to at least one embodiment, the field of view is divided into a plurality of regions. For example, the field of view is divided into several rectangular, especially square, regions. For example, the field of view is divided into rectangular regions that are arranged next to each other at the nodes of a regular rectangular grid. In particular, each point of the field of view is assigned to at least one region. The regions can overlap each other partially, so that a point of the field of view can be assigned to several regions.

According to at least one embodiment, the semiconductor component has a plurality of pixels, each of which is provided to illuminate a region of the field of view. For example, several pixels are assigned to a region so that a region can be illuminated by the light of several pixels. In particular, each region can be illuminated by at least one pixel.

The pixels of the semiconductor component can be operated separately. For example, the brightness and/or the color location of the emitted light of a pixel can be specified separately from other pixels. The pixels are arranged next to each other in a lateral plane which runs parallel to the emission surface of the semiconductor component. For example, the pixels are arranged side by side along the nodes of a regular rectangular grid in the lateral plane.

For example, each pixel is formed with a semiconductor chip, whereby each semiconductor chip can be manufactured in a separate manufacturing process.

Alternatively, a semiconductor chip comprises a large number of pixels produced in a common manufacturing process. For example, the pixels are formed with semiconductor layers that are produced by a common epitaxial process. For example, the lateral expansion of a single pixel is limited by trenches that cut through at least one of the semiconductor layers. The trenches can, for example, be produced using a lithographic process. Alternatively, the pixels have continuous semiconductor layers, whereby the expansion of the individual pixels in the lateral direction is defined by the lateral expansion of contact structures through which the pixels are supplied with current.

Further it is possible that each pixel comprises two or more semiconductor chips, each semiconductor chip forming a subpixel of the pixel.

According to at least one embodiment, the pixels each comprise at least one first type subpixel and one second type subpixel. The subpixels are arranged side by side in the lateral plane. In particular, subpixels of a pixel are arranged adjacent to each other. In this context, "adjacent to each other" means that no further subpixels of another pixel are arranged in the lateral direction between adjacent subpixels of one pixel.

The subpixels are configured to be controlled separately from each other. In particular, individual subpixels can be controlled and operated separately by means of the drive circuit. For example, the intensity of the emitted light of a subpixel can be adjusted separately from the intensity of the emitted light of further subpixels.

According to at least one embodiment, the first type subpixel is configured to emit light of a white color location and the second type subpixel is configured to emit light of a non-white color location. For example, the first type subpixel is configured to emit light of a warm white or cold white color location. Warm white light has a maximum color temperature of 3300 Kelvin and cold white light has a minimum color temperature of 3300 Kelvin. The second type subpixel can be configured to emit light from a red, green or blue color location.

According to at least one embodiment, the lighting device comprises a semiconductor component for generating light and a drive circuit, wherein, in operation of the semiconductor component emitted light illuminates a field of view, the field of view is divided into a plurality of regions, the semiconductor component comprises a plurality of pixels, each being provided for illuminating a region of the field of view, the pixels each comprising at least a first type subpixel and a second type subpixel, the first type subpixel being configured to emit light of a white color location and the second type subpixel being configured to emit light of a non-white color location.

A lighting device described here is based, among other things, on the following considerations. A light-emitting component is used to illuminate a field of vision in an object room. This component is configured to illuminate the entire field of view with light. In particular, the lighting device illuminates the entire field of view with light of a common wavelength range and homogeneous intensity.

The lighting device described here now makes use, among other things, of the idea of dividing the field of view into several regions, each of which can be illuminated independently of the other by means of the lighting device. In particular, the lighting device is configured to illuminate the individual regions separately by means of light from different pixels. By means of the subpixels of each pixel, the color location and the intensity of the emitted light of each pixel can be adjusted separately, so that the regions can be illuminated separately from each other with light of a predefinable color location and a predefinable brightness.

Advantageously, the brightness and the color location of individual regions in a field of view can be adjusted by means of the lighting device, so that the field of view has an optimal illumination to be captured by the sensor of a camera. In particular, the lighting device can be used to highlight individual regions in the field of view by adjusting the illumination intensity and color location.

According to at least one embodiment of the lighting device, the pixels are arranged in a lateral plane in a two-dimensional matrix arrangement. For example, the pixels are arranged next to each other in the lateral plane at the nodes of a regular rectangular grid. In particular, the subpixels are arranged side by side in the same lateral plane. For example, the pixels are arranged in a two-dimensional matrix whose aspect ratio corresponds to the aspect ratio of the field of view. Advantageously, the pixels of the semiconductor component are arranged in a particularly space-saving manner, so that the lighting device has a particularly compact design. In addition, the light emitted by the pixels can be directed particularly efficiently into individual regions in the field of vision.

According to at least one embodiment of the lighting device, the semiconductor component comprises a maximum of 128 pixels. In particular, the semiconductor component comprises a maximum number of 100 pixels. Each pixel, in particular each subpixel, has at least one electrical contact via which this pixel, in particular subpixel, can be individually controlled electrically. Advantageously, a semiconductor component with such a specified maximum number of pixels has simplified controllability.

According to at least one embodiment of the lighting device, a pixel has a minimum lateral expansion of 100 μm in a lateral direction. In particular, a pixel in a lateral direction has a minimum lateral expansion of 140 μm. Advantageously, such a large lateral expansion of individual pixels allows a particularly high illumination intensity of individual regions of the field of view. In particular, the area of the light-emitting semiconductor component is used particularly efficiently in the lateral direction, since regions in which different pixels adjoin each other are minimized.

According to at least one embodiment of the lighting device, subpixels of different types are formed by means of different semiconductor materials. For example, the subpixels of different types are produced separately by different manufacturing processes. For example, electromagnetic radiation of a color location, which is to be emitted by the respective subpixel during intended operation, is generated in the active zones of the subpixels. Advantageously, a conversion element which converts light generated in the active zone into light of a different wavelength is not necessary, so that the semiconductor component emits electromagnetic radiation particularly efficiently.

According to at least one embodiment of the lighting device, subpixels of different types have different conversion elements and are formed with a same semiconductor material. For example, the subpixels of different types are produced in a common manufacturing process, so that in the active zone of each subpixel light of the same color location is generated. Different conversion elements can be subordinate to subpixels of different types, so that the light generated in the active zones hits the conversion element associated with the respective subpixel and at least part of the generated light in converted into light of a different wavelength range. In particular, the light generated in the subpixel is converted into light of a different wavelength range by means of different conversion elements. Advantageously, the subpixels formed with the same semiconductor material exhibit particularly similar electro-optical properties, so that these can be controlled in a particularly simplified manner. Furthermore, the subpixels formed with the same semiconductor material can be arranged very close to each other, so that the area of the semiconductor component is used particularly efficiently in the lateral direction.

According to at least one embodiment of the lighting device, the conversion elements have a thickness perpendicular to the lateral plane of at least 60 μm and a maximum thickness of 100 μm. The preferred thickness of the conversion elements is at least 70 μm and maximum 80 μm. For example, the light generated in the active zones is scattered at least partially as it passes through the conversion elements, so that the contrast ratio between adjacent subpixels is reduced for an observer of the conversion element by means of the conversion elements. Advantageously, a scattering conversion element allows improved mixing of the light emitted by subpixels of a pixel. Furthermore, the scattering conversion elements lead to a smoother transition of illumination intensity and color location of adjacent pixels.

According to at least one embodiment of the lighting device, a pixel comprises a third type subpixel and a fourth type subpixel, wherein the third type subpixel is configured to emit electromagnetic radiation of a further white color location, and the fourth type subpixel is configured to emit electromagnetic radiation of a further non-white color location. For example, the further white color location is not the same color location as the white color location. In particular, the white color location is a warm white color location and the further white color location is a cold white color location. For example, the non-white color location and the further non-white color location are different color locations. In particular, the non-white color location is a color location in the red wavelength range and the further non-white color location is a color location in the blue wavelength range.

For example, a pixel emits mixed light of the first type subpixel, the second type subpixel, the third type subpixel and/or the fourth type subpixel. Advantageously, mixed light of a predeterminable color location and intensity can be emitted by means of subpixels of different types assigned to a pixel. In particular, the light of different pixels is directed into different regions in the field of view. In particular, the light from subpixels of a common pixel is directed as mixed light into a common region of the field of view. Advantageously, the field of view can be illuminated by the white subpixels and the further white subpixels by warm white or cold white light. In addition, pixels emitting light from a non-white color location can be used to highlight individual color tones in regions of the field of view.

According to at least one embodiment of the lighting device, the illumination intensity generated by the lighting device differs by a maximum factor of 1.5 in regions adjacent to one another. Preferably, the illumination intensity generated by the lighting device differs by a maximum factor of 1.2 in regions adjacent to each other. For example, the pixels have scattering conversion elements and/or light-scattering elements which scatter the light emitted by pixels. It is advantageous that neighboring regions appear homogeneously illuminated and do not show any sudden change in color location and/or brightness when moving from one region to another.

According to at least one embodiment of the lighting device, an intermediate carrier is arranged between the semiconductor component and the drive circuit, via which the semiconductor component is electrically connected to the drive circuit. For example, the intermediate carrier comprises electrical contacts and conductor tracks via which the drive circuit and the semiconductor component are electrically conductively connected to each other. In particular, the intermediate carrier serves as the mechanically supporting component. It is advantageous that the semiconductor component and the control circuit can be manufactured separately and tested separately before they are mechanically and electrically connected. This increases the yield of fault-free lighting devices during production.

According to at least one embodiment of the lighting device, the lighting device comprises an optical element, wherein the optical element directs light from subpixels of different type of a pixel into a same region of the field of view, and the optical element directs light from at least one pixel into each region. For example, the individual regions of the field of view can be illuminated separately by operating individual pixels. For example, the region to be illuminated is illuminated with mixed light from the individual subpixels, so that the color location and illumination intensity of the light used to illuminate the individual regions can be adjusted by operating the subpixels separately. Advantageously, the separate operation of individual subpixels makes it possible to set the color location and/or illumination intensity in each region and the separate operation of individual pixels makes it possible to illuminate individual regions in the field of view.

In addition, a method for operating a lighting device is specified. In particular, the method can be used to operate a lighting device described here. This means that all the features disclosed for the lighting device are also disclosed for the method and vice versa.

According to at least one embodiment of the method for operating the lighting device, the regions are illuminated separately from one another by means of light of a predeterminable color location and a predeterminable brightness. In particular, the regions can be illuminated simultaneously with light of different brightness and/or a different color location. For example, the pixels of the lighting device are operated separately from each other, so that individual regions of the field of view are illuminated with a given illumination intensity. In particular, individual subpixels of the lighting device are operated separately so that the color location of the light used to illuminate the individual regions can be set. It is advantageous to use such lighting to highlight individual regions in the field of view compared with other regions by means of increased brightness or color-accentuated lighting. Alternatively, regions which have a lower brightness or a different color location relative to other regions can be adjusted to the other regions by means of the lighting.

According to at least one embodiment of the method for operating a lighting device, the pixels are operated with a current density of at least 10 mA/mm$^2$, whereby the current is not pulsed. For example, the pixels are operated with a current density which leads to a heating of the semiconductor component. In particular, the electrical energy converted into heat in a pixel is greater than the heat that can be dissipated during operation of the semiconductor component. Thus, the pixels of the semiconductor component can only be operated for a specified period of time without the semiconductor component exceeding a specified operating temperature. For example, the semiconductor component can be operated for a maximum of one second, in particular a maximum of 0.5 seconds, without exceeding the specified operating temperature when all pixels are operated as intended. In particular, the lighting device is configured to be operated as a flashlight, wherein the individual pixels are operated with a current density of at least 10 mA/mm$^2$.

For example, the current with which the pixels of the semiconductor component are operated is not pulsed. In particular, the semiconductor component is not driven by a pulse width modulated (PWM) signal. In particular, the pixels are operated with a current whose modulation frequency is a maximum of 10 Hertz, preferably a maximum of 3 Hertz. In this context, "non-pulsed" means that the current with which the pixels are operated does not have continuous pulse modulation. Advantageously, the semiconductor component can be operated with particularly high current densities, so that a particularly high illumination intensity is achieved. In particular, the pixels are operated with a continuous current so that the illumination intensity of the field of view does not fluctuate during a measurement with a sensor. For example, the sensor may be a CCD chip or a CMOS chip which is read line by line. Advantageously, the lighting device illuminates the field of view with a constant illumination intensity, which does not vary during the reading of the individual lines of the sensor.

According to at least one embodiment of the method for operating the lighting device, the field of view is projected on a sensor, and the color location and/or brightness of the light with which a region is illuminated depend on the color location and/or brightness of this region detected by the sensor. For example, the sensor is a CCD or CMOS sensor that is configured to measure brightness and color location. An optical device is used to project the field of view on the sensor. For example, the sensor transmits measured brightness and color values to the drive circuit. For example, the drive circuit is used to determine color locations and/or the brightness of individual regions. In particular, the drive circuit can transmit the determined values of the color location and/or brightness to an external processor, which is configured to perform arithmetic operations, for example. Using the external processor, for example, the brightness and/or color values within individual regions can be averaged or the differences between brightness and color values of different regions can be calculated. The pixels assigned to the regions can then be controlled by the drive circuit as a function of the determined values of the color coordinates and/or brightness. It is advantageous to use this method to adapt the operation of the lighting device to the field of view so that individual regions of the field of view are illuminated more intensively by light from a specific color location or brightness.

According to at least one embodiment of the method for operating a lighting device, the illumination intensity by means of the lighting device is greater in a region the lower the brightness of this region detected by means of the sensor.

The regions can be illuminated as a function of the brightness detected in these regions. For example, by operating the pixels assigned to a region, the illumination intensity is specifically increased so that the lower the brightness measured in this region, the greater the illumination intensity. In particular, by increasing the illumination intensity in a region, the brightness of the region measured by the sensor can be increased. Advantageously, regions with low brightness can be illuminated separately without additionally illuminating regions with sufficient brightness, so that the brightness in the field of view is homogenized overall.

According to at least one embodiment of the method for operating a lighting device, the color location of a region is detected by means of the sensor and this region is illuminated with light from a color location that is the same within a tolerance range by means of the lighting device. For example, the averaged color location of the region deviates by no more than ±0.01 Cx and ±0.01 Cy from the color location of the light from the lighting device in this region. It is advantageous to use this method to highlight existing color tones in the field of view so that a particularly intense color impression is created.

According to at least one embodiment of the method for operating a lighting device, the sensor detects a red, green and blue color component of the color location of a region and this region is illuminated with light in the red, green and/or blue wavelength range by means of the lighting device, wherein the illumination intensity with light in a wavelength range of the lighting device in this region is greater the lower the color component detected by the sensor in this region.

For example, the subpixels of the light-emitting semiconductor component are operated depending on the color location which is detected in a region by means of the sensor. In particular, the subpixels are operated in such a way that a region is illuminated by light that has a dominant color component. Light with a dominant color component has a particularly high intensity in a non-white wavelength range, so that the light has a non-white color location. In particular, the light with the dominant color component has a red, green or blue color location. For example, by illuminating a region with light that has a dominant color component, this color component can be increased in that region. Thus, color components that are less present relative to other color components within a region can be increased by means of the lighting device. Advantageously, by means of such a method, weakly existing color components in the field of view are increased in individual regions, so that a particularly homogeneous color impression within the field of view is created.

According to at least one form of embodiment of the method for operating a lighting device, a first projection of the field of view is recorded in a method step A by means of the sensor, whereby the field of view is not illuminated or not illuminated at full power of the lighting device. For example, the first projection is taken with a particularly long integration time of at least 0.5 seconds. In particular, the first projection is exposed to a maximum of 70 percent, preferably 50 percent, of the maximum illumination intensity of the lighting device, while the sensor is used to record the first projection.

Further, in a process step B, the first projection is used to determine the first actual values of the regions of the field of view and target values are assigned to the regions. The actual values of the regions, which are determined on the basis of the first projection of the field of view, include, for example, a brightness value and a color location of each region. In particular, the actual values each include a brightness value averaged over the region and a color location averaged over the region. Furthermore, target values are assigned to the individual regions, which each comprise a brightness value and a color location. In particular, a target value range is assigned to the regions, which comprises a value range for the brightness and the color location.

In a process step C, a second projection is recorded by means of the sensor, wherein the field of view is illuminated by means of the lighting device, so that the difference between second actual values of the second projection and target values of the regions is minimized. In particular, the second projection captures the same region of the object space as the first projection.

During the acquisition of the second projection, the field of view is illuminated by the lighting device. When the second projection is recorded, the field of view shows in the regions second actual values which can be detected by the sensor and transmitted to the drive circuit. In particular, the field of view is illuminated during the recording of the second projection in such a way that the difference between the actual values and the target values of each region is minimized.

For example, the individual regions are illuminated by the lighting device in such a way that the second actual values are within the target value range. It is advantageous to operate the lighting device in this way to achieve particularly efficient illumination of the field of view, with optimum illumination in all regions. Optimum illumination is achieved, for example, if the sensor shows no overexposed or underexposed regions.

According to at least one embodiment of the method for operating a lighting device, the field of view is illuminated with electromagnetic radiation in the infrared wavelength range in method step A and the field of view is projected on an infrared detector in the infrared wavelength range. In process step B, the first actual values of the field of view are also determined on the basis of the projection in the infrared wavelength range. For example, the infrared detector is a separate detector from the sensor on which the field of view is projected by means of a further imaging optical device. In process step A, the field of view can be illuminated with infrared radiation, whereby, for example, all regions are illuminated simultaneously with infrared radiation. In particular, all regions are illuminated by a common infrared radiation emitting component, whereby the illumination intensity of the individual regions cannot be separately adjusted by means of the infrared radiation emitting component.

In particular, the first actual values are determined from the projection in the infrared wavelength range, whereby the actual value of each region includes an intensity value in the infrared wavelength range. For example, in the intended operation of the lighting device, regions whose first actual value has a particularly high intensity in the infrared wavelength range are illuminated in method step B with a particularly high illumination intensity in the visible wavelength range and/or selectively with light from a warm white color location. It is advantageous that such a method can be used, for example, to illuminate a person within the field of vision.

According to at least one embodiment of the method for operating a lighting device, an actual value includes an actual brightness and an actual color location, and a target value includes a target brightness and/or a target color location. In particular, an actual value also includes an intensity value in the infrared wavelength range. For example, process steps B and C are performed several times in succession, so that each time a projection is recorded, the difference between actual and target values is reduced. In particular, regions in which illumination by means of the lighting device has no influence on actual values or only a minor influence on actual values are not operated when the next projection is taken. The advantage of this is that the lighting device can be operated particularly efficiently.

BRIEF DESCRIPTION OF THE DRAWINGS

Advantageous embodiments and developments of the lighting device and the method for operating the lighting device will become apparent from the exemplary embodiments described below in association with the figures.

In the exemplary embodiments and figures, similar or similarly acting constituent parts are provided with the same reference symbols. The elements illustrated in the figures and their size relationships among one another should not be regarded as true to scale. Rather, individual elements may be represented with an exaggerated size for the sake of better representability and/or for the sake of better understanding.

DETAILED DESCRIPTION OF ILLUSTRATIVE EMBODIMENTS

Figure 1:
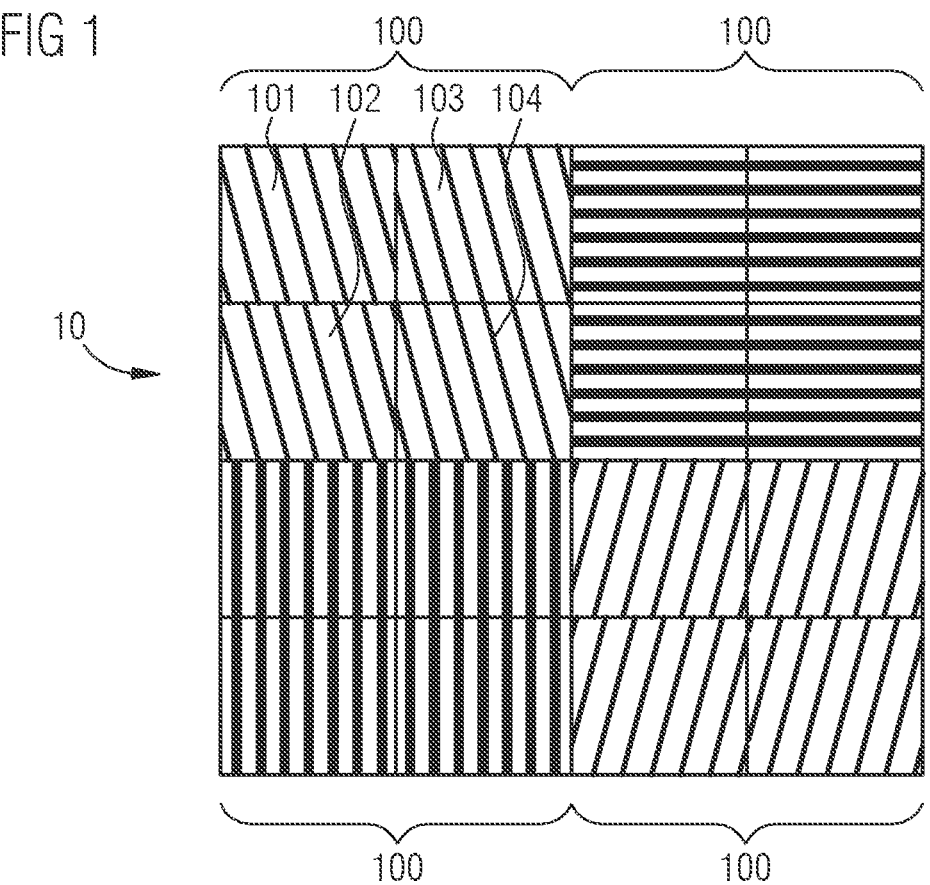
FIGS. 1, 2A, 2B, 2C and 2D show exemplary embodiments of a light emitting semiconductor component of a lighting device.

FIG. 1 shows a schematic plan view of a lateral plane of a semiconductor component 10 of a lighting device 1 described here according to a first example. The semiconductor component 10 comprises four pixels 100, each formed by a first type subpixel 101, a second type subpixel 102, a third type subpixel 103 and a fourth type subpixel 104. The pixels 100 of the light-emitting semiconductor component 10 are arranged side by side in the lateral plane at the nodes of a regular rectangular grid. The subpixels 101, 102, 103, 104 of all pixels 100 are arranged side by side in the lateral plane at the nodes of a regular rectangular grid. In particular, the subpixels 101, 102, 103, 104 of a pixel 100 are arranged adjacent to each other. In this context, arranged adjacent to each other means that between two adjacent subpixels 101, 102, 103, 104 of one pixel 100 no further subpixel 101, 102, 103, 104 of another pixel 100 is arranged in the lateral plane.

Each subpixel 101, 102, 103, 104 comprises an active zone configured to generate electromagnetic radiation, in particular light, during intended operation. The individual subpixels can be controlled separately from each other. In particular, subpixels of different types 101, 102, 103, 104 are configured to generate light from a different color location and emit it in a direction transverse to the lateral plane. In particular, first type 101 subpixels are configured to emit light from a warm white color location. In particular, second type 102 subpixels are configured to emit light from a cold white color location. In particular, third type subpixel 103 are configured to emit light in the red wavelength range. In particular, fourth type subpixels 104 are configured to emit light in the blue wavelength range. For example, a pixel 100 in lateral directions has a minimum lateral expansion of 100 μm, especially 140 μm.

Figure 2A:
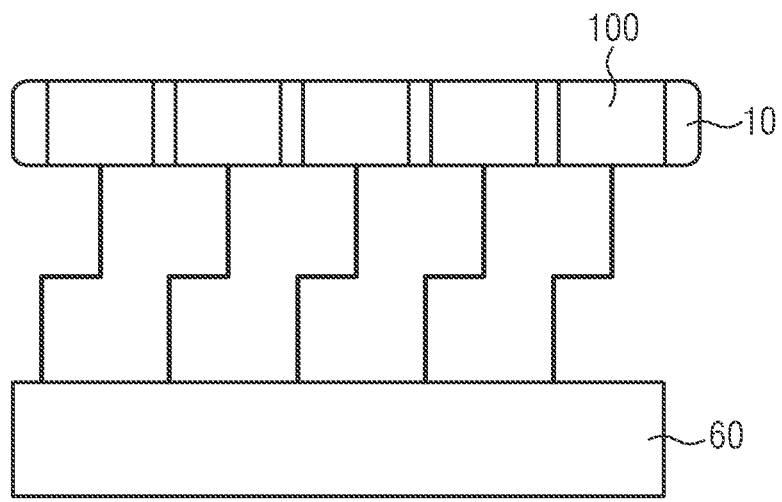

FIG. 2A shows a schematic cross-section of a light-emitting semiconductor component 10, which is electrically conductively connected to a drive circuit 60. In particular, the light-emitting semiconductor component 10 comprises a plurality of pixels 100, which are individually electrically conductively connected to drive circuit 60. For example, the pixels 100 can be operated separately from each other by means of drive circuit 60. In particular, each pixel 100 comprises at least one first type subpixel 101 and one second type subpixel 102, wherein subpixels of different type of a pixel 100 can be driven separately from each other by means of the drive circuit 60. The drive circuit 60 is, for example, a semiconductor chip which is configured to drive the semiconductor component 10 during intended operation and to supply it with current. In particular, the drive circuit 60 is an integrated circuit.

Figure 2B:
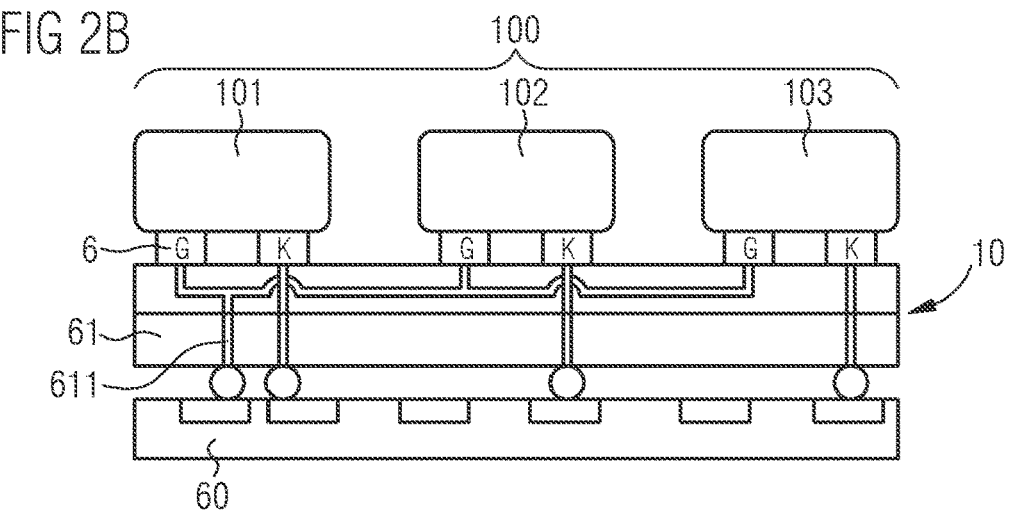

FIG. 2B shows a schematic cross-section of a light-emitting semiconductor component 10, an intermediate carrier 61 and a drive circuit 60. The semiconductor component 10 comprises a first type subpixel 101, a second type subpixel 102 and a third type subpixel 103. The subpixels are formed by separately manufactured semiconductor structures which are configured to generate light L of different wavelength ranges. The subpixels 101, 102 and 103 are part of a pixel 100 of a light-emitting semiconductor component 10. The light-emitting semiconductor component 10 is mechanically and electrically connected to the drive circuit 60 by means of the intermediate carrier 61. In particular, the subcarrier 61 comprises a rewiring structure 611 by means of which the electrical contacts of the individual subpixels 101, 102 and 103 are electrically conductively connected to the drive circuit 60. In particular, each subpixel 101, 102, 103 has a ground contact G which is connected to the drive circuit 60 via a common electrical line of the rewiring structure 611. Via a further contact K of each subpixel 101, 102, 103, the subpixels 101, 102, 103 can be operated separately from each other.

Figure 2C:
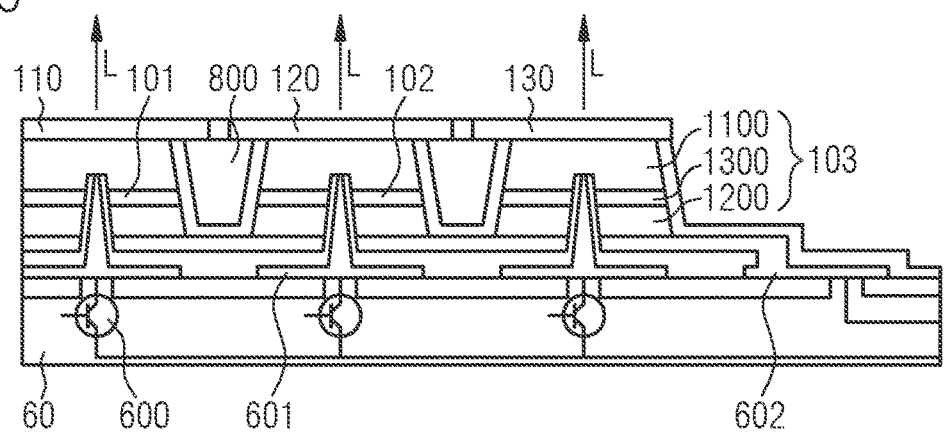

FIG. 2C shows a schematic cross-section of a light-emitting semiconductor component 10 described here and a drive circuit 60. The light-emitting semiconductor component 10 comprises a first type subpixel 101, a second type subpixel 102 and a third type subpixel 103. Each subpixel is formed with a first conducting region 1100, a second conducting region 1200 and an active zone 1300. During normal operation, the subpixels are each supplied with current via the first conducting region 1100 and via the second conducting region 1200, so that light is generated in the active zone 1300. In particular, the subpixels 101, 102, 103 emit light L through the side facing away from the drive circuit 60 during intended operation. The individual subpixels 101, 102, 103, for example, are manufactured using a common manufacturing process and have the same material composition and layer structure. In particular, in the active zones 1300 of subpixels of different types 101, 102, 103 light L of the same color location is generated.

The light-emitting semiconductor component 10 is mechanically connected to the control circuit 60. In particular, the drive circuit 60 is formed with a semiconductor material and connected to the light-emitting semiconductor component 10 by means of a bonding process or a soldering process. For example, the drive circuit 60 and the light-emitting semiconductor component 10 are cohesively connected to each other, so that the connection can only be released by destroying the semiconductor component 10 or the drive circuit 60. The drive circuit 60 comprises a plurality of transistors 600, which can be used to control the individual subpixels of the light-emitting semiconductor component 10. In particular, each subpixel 101, 102, 103 is electrically connected to a transistor 600 via a first contact 601. In addition, the drive circuit 60 has a second contact 602, by means of which all subpixels of the light-emitting semiconductor component 10 are electrically conductively contacted.

Conversion elements 110, 120, 130 are arranged on the side of the light-emitting semiconductor component 10 facing away from control circuit 60. In particular, a first conversion element 110 is subordinated to the first type 101 subpixel in the beam direction, a second conversion element 120 is subordinated the second type 102 subpixel in the beam direction, and a third conversion element 130 is subordinated the third type subpixel in the beam direction. For example, the conversion elements 110, 120, 130 are configured to convert the light L of each subpixel generated in the active zone 1300 at least partially into light L of a different wavelength range. In particular, first, second and third conversion elements are configured to convert light generated in subpixels of different types 101, 102, 103 into light of different wavelength ranges.

The first conducting region 1100, the second conducting region 1200 and the active zone 1300 of different subpixels are completely separated by separation trenches 800. For example, the separation trenches are produced using a lithographic process or a laser cutting process.

Figure 2D:
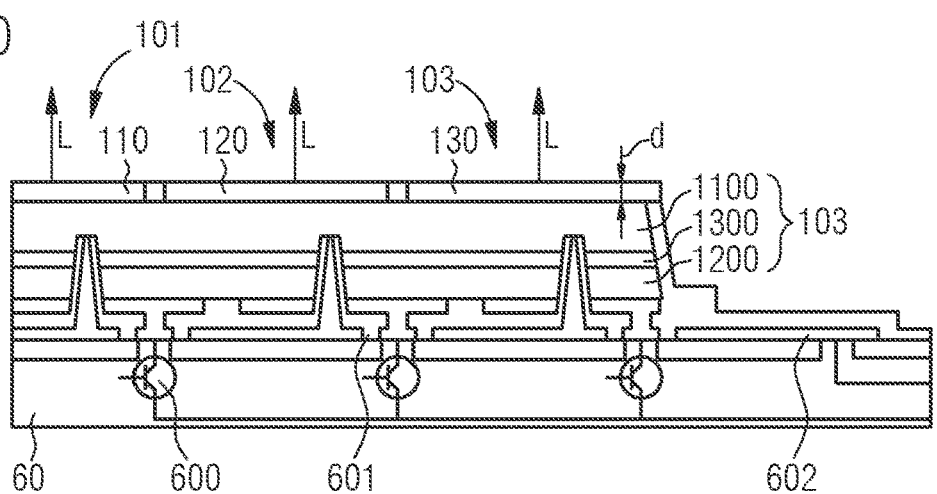

FIG. 2D shows the cross-sectional view of a light-emitting semiconductor component 10 and a drive circuit 60, whereby in contrast to the exemplary embodiment shown in FIG. 2C, the first conducting region 1100, the second conducting region 1200 and the active zone 1300 are not separated by a separation trench 800. In particular, several subpixels of different types 101, 102, 103 are formed with an active zone 1300 which is not severed. For example, the lateral expansion of a subpixel is defined by the lateral expansion of the first contact structure 601 and the lateral expansion of the conversion element subordinate to the respective subpixel. In particular, subpixels of different types are formed with the same semiconductor material and have different conversion elements. In particular, first conversion elements 110, second conversion elements 120, and/or third conversion elements 130 have a thickness d of at least 60 µm and of at most 100 µm perpendicular to the lateral plane. In particular, the light L is scattered in the conversion elements 110, 120, 130, so that the intensity of the light L emitted by adjacent pixels 100 differs by a maximum factor of 1.5.

Figure 3:
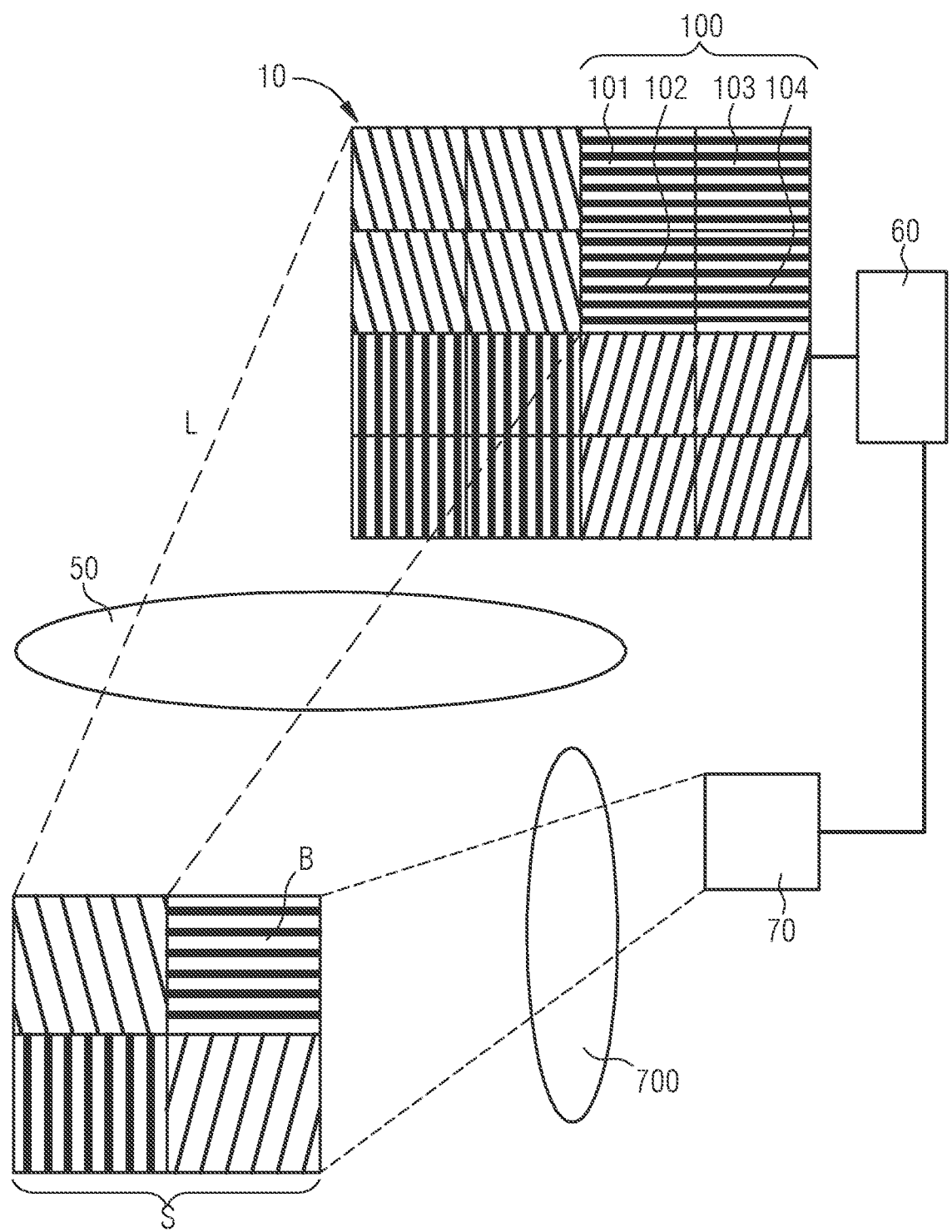
FIGS. 3, 4A and 4B show exemplary embodiments of a lighting device.

FIG. 3 shows a schematic view of a lighting device 1 described here. The lighting device 1 comprises a light-emitting semiconductor component 10, a drive circuit 60, a sensor 70, an optical device 700 and an optical element 50. During normal operation, the light-emitting semiconductor component 10 emits light L. In the direction of emission of the light L, the optical element 50, by means of which the emitted light L is directed onto a field of view S, is subordinated to the semiconductor component 10. The optical element 50 is configured to direct light from subpixels of different types 101, 102, 103, 104 of a pixel 100 into a common region B of the field of view S. In addition, the optical element 50 is configured to direct light L of at least one pixel 100 into each region B. By selectively operating individual pixels 100, individual regions B of the field of view S can be illuminated. By selectively operating individual subpixels 101, 102, 103, 104, the color location and brightness of the light L, which is used to illuminate a single region B, can be adjusted. In particular, a region B of the field of view S is illuminated with mixed light of subpixels 101, 102, 103, 104 of a pixel 100.

The field of view S is a region in an object space which is projected by means of the optical device 700 on the sensor 70. The sensor 70 is, for example, a CCD or CMOS sensor. During intended operation, the sensor 70 transmits data of the projection of the field of view S to the drive circuit 60, so that the light-emitting semiconductor component 10 can be operated, for example, as a function of the data determined by the sensor 70.

For example, regions B can be illuminated separately from each other using light L of a predefinable color location and a predefinable brightness. In particular, the pixels 100 are operated with a current density of at least 10 mA/mm$^2$ during intended operation. In particular, the pixels are operated with a current that is not pulsed.

In particular, the color location and/or intensity of the light L, with which a region B is illuminated, is adapted to the color location detected by the sensor 70 and/or the brightness of this region B detected by the sensor 70. For example, the lower the brightness of region B detected by sensor 70, the greater the illumination intensity in region B by means of the lighting device 1. In particular, sensor 70 detects the color location of a region B and this region B is illuminated with light L of a same color location within a tolerance range by the lighting device 1.

Alternatively, a red, green and blue color component of the color location of a region B is detected by means of the sensor 70, whereby this region B is illuminated with light L in the red, green and/or blue wavelength range by means of the lighting device 1. For example, the illumination intensity with light L of a wavelength range of the lighting device 1 in a region B is the greater, the lower the color component in this region B detected by the sensor 70.

For example, the current with which the individual subpixels of the light-emitting semiconductor component 10 are operated is adapted in several method steps. In a method step A, a first projection A1 of the field of view S is recorded by means of the sensor 70, whereby the field of view S is not illuminated or not illuminated at the full power of the lighting device 1. In a method step B, first actual values I1 of the regions B of the field of view S are determined on the basis of the first projection A1, and target values SO are assigned to the regions B. An actual value I comprises an actual brightness and/or an actual color location. A target value SO comprises a target brightness SH and/or a target color location SF. In a method step C, a second projection A2 is recorded by means of sensor 70, whereby the field of view S is illuminated by means of lighting device 1. The field of view S is illuminated in such a way that the difference between the second actual values I2 of the second projection A2 and the target values SO of the regions B is minimized. Thus the lighting device 1 is operated in such a way that the brightness and/or the color location of each region B, which is projected on the sensor 70, match a target value SO.

Figure 4A:
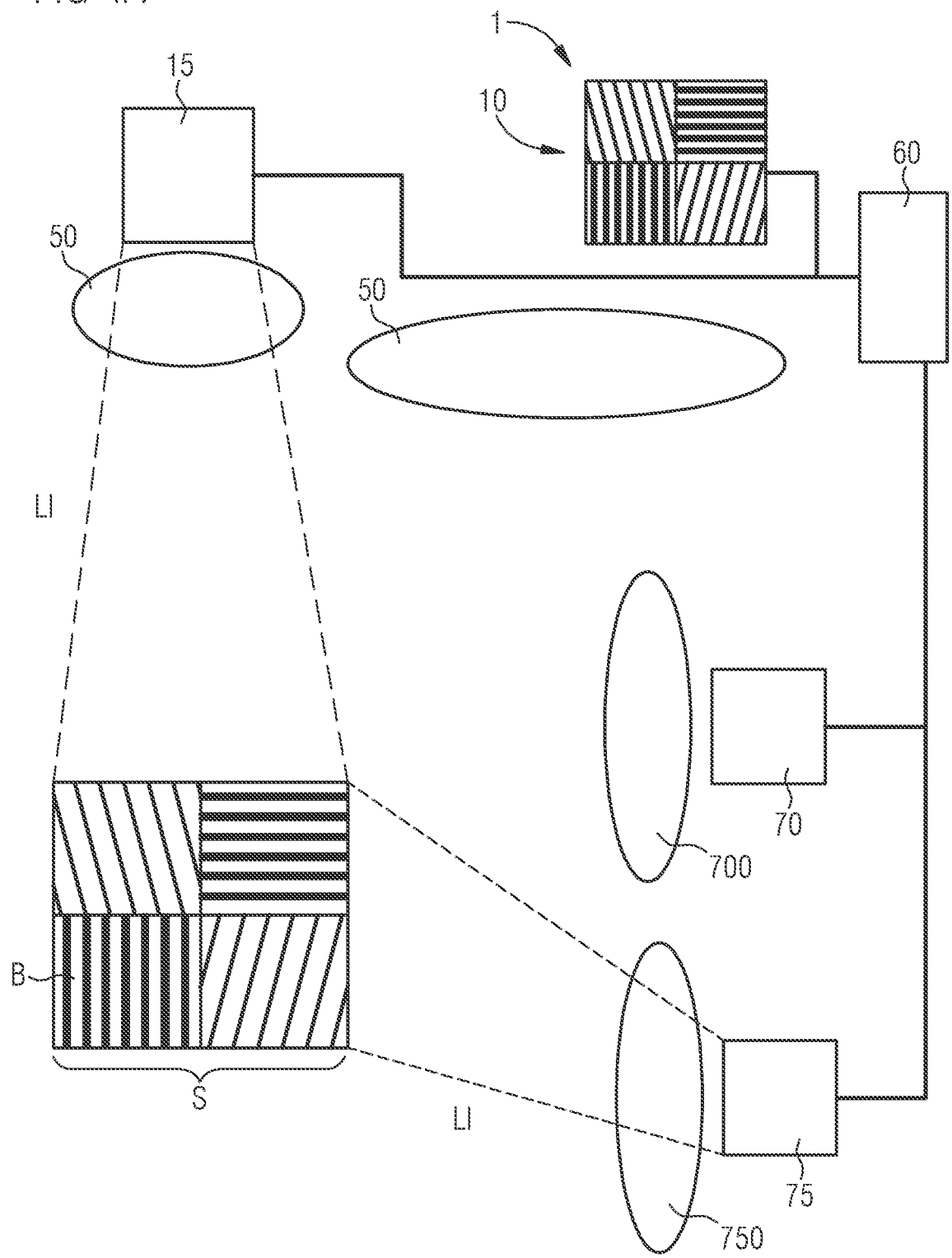

FIG. 4A shows a schematic view of a lighting device 1, whereby the lighting device 1, in contrast to the exemplary embodiment shown in FIG. 3, also comprises an infrared sensor 75 and an infrared radiation emitting component 15. When the infrared radiation emitting component 15 is used as intended, it emits electromagnetic radiation LI in a wavelength range between 700 and 1,500 nm. The emitted infrared radiation LI is directed onto the field of view S by means of an optical element 50. The same optical element 50 or another optical element 50 as the light-emitting semiconductor component 10 can be subordinate to the infrared radiation emitting component 15. In particular, all regions B of the field of view S are illuminated simultaneously by means of the infrared radiation emitting component 15.

The infrared sensor 75 in configured to detect electromagnetic radiation from the field of view S. For example, the field of view S is projected on the infrared sensor 75 by means of another optical device 750. For example, in method step A the field of view S is illuminated with electromagnetic radiation LI in the infrared wavelength range and the field of view S is projected in the infrared wavelength range on the infrared detector 75. In particular, a first projection A1 of the field of view is recorded in method step A.

Figure 4B:
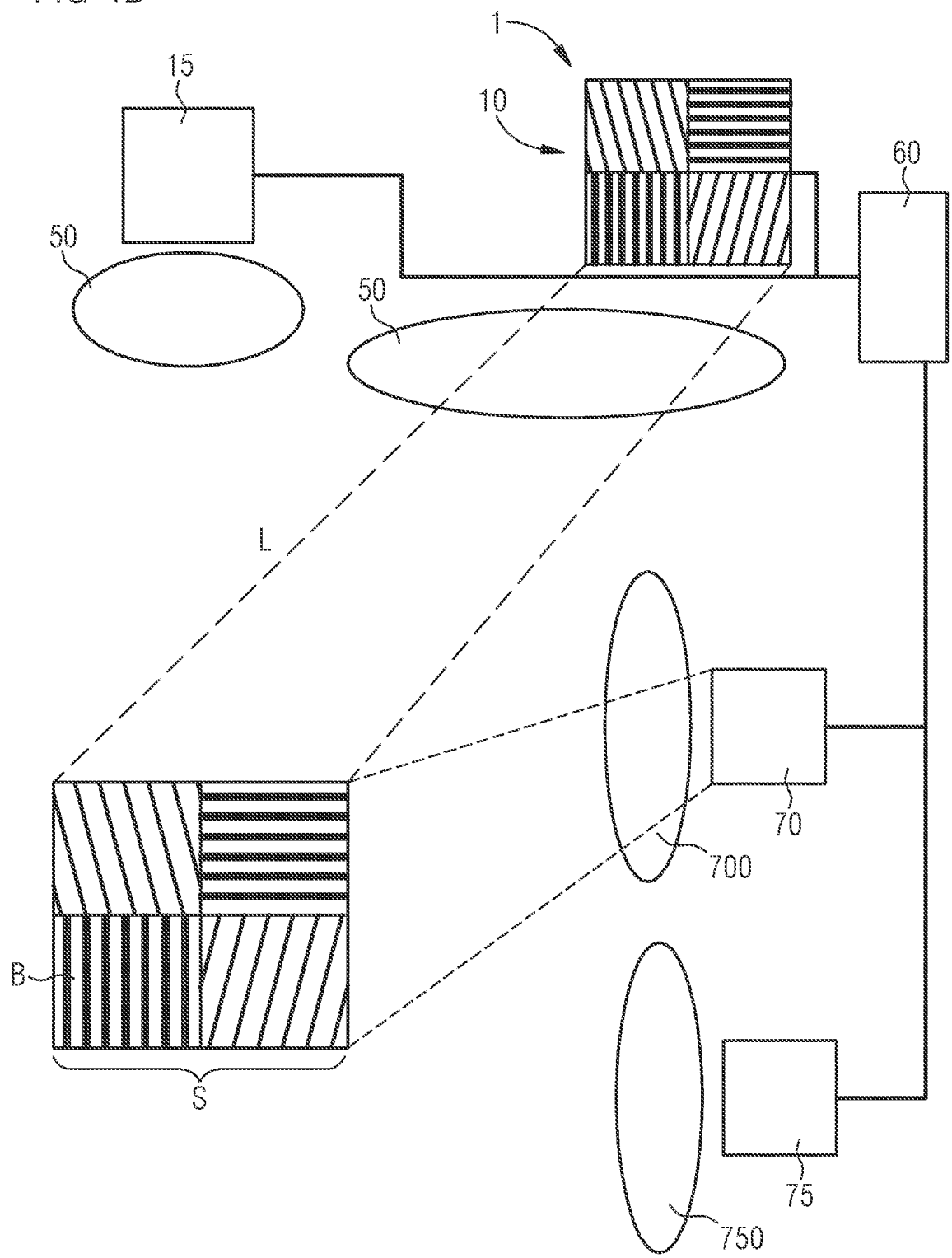

FIG. 4B shows the lighting device from FIG. 4A, whereby in method step B the first actual values I1 of the regions B of the field of view S were determined on the basis of the first projection in the infrared wavelength range taken in method step A. Furthermore, in method step B, each region B in the field of view S was assigned a target value SO.

In a method step C, a second projection A2 is recorded by means of the sensor 70, whereby the field of view S is illuminated by means of the light-emitting semiconductor component 10, so that the difference between second actual values I2 of the second projection A2 and target values SO of regions B is minimized.

In particular, the light-emitting semiconductor component 10 is operated as a function of the data determined from the infrared wavelength range projection. It is advantageous that the lighting device 1 can be operated on the basis of the projection in the infrared wavelength range, so that the actual values I of the regions B of a subsequent projection are particularly close to the target values SO or match to the target values.

The invention is not restricted to the exemplary embodiments by the description on the basis of said exemplary embodiments. Rather, the invention encompasses any new feature and also any combination of features, which in particular comprises any combination of features in the patent claims and any combination of features in the exemplary embodiments, even if this feature or this combination itself is not explicitly specified in the patent claims or exemplary embodiments.

The invention claimed is:

1. A lighting device comprising:
at least one semiconductor component comprises a plurality of pixels and configured to generate light illuminating a field of view; and
a drive circuit,
wherein the field of view is divided into a plurality of regions,
wherein each pixel is configured to illuminate a region of the field of view,
wherein each pixel comprises at least a first type subpixel, a second type subpixel, a third type subpixel and a fourth type subpixel,
wherein the first type subpixel is configured to emit light of a white color location and the second type subpixel is configured to emit light of a non-white color location,
wherein the third type subpixel is configured to emit electromagnetic radiation from a further white color location, and
wherein the fourth type subpixel is configured to emit electromagnetic radiation from a further non-white color location.

2. A method for operating a lighting device comprising a drive circuit and at least one semiconductor component comprising a plurality of pixels, wherein each of the pixel comprises at least a first type subpixel and a second type subpixel, the method comprising:
illuminating a field of view with light emitted from the semiconductor component,
wherein the field of view is divided into a plurality of regions,
wherein each pixel illuminates a region of the field of view,
wherein the first type subpixel emits light of a white color location and the second type subpixel emits light of a non-white color location, and
wherein the regions are illuminated separately from one another by light of a predeterminable color location and a predeterminable brightness;
recording a first projection of the field of view by a sensor, wherein the field of view is not illuminated or is not illuminated with full power by the semiconductor component;
determining first actual values of the regions of the field of view on basis of the first projection and assigning target values to the regions; and
recording a second projection by the sensor, wherein the field of view is illuminated by the semiconductor component so that differences between second actual values of the second projection and target values of the regions are minimized.

3. The method according to claim 2, wherein the pixels are arranged in a lateral plane in a two-dimensional matrix arrangement.

4. The method according to claim 2, wherein the semiconductor component comprises a maximum of 128 pixels.

5. The method according to claim 2, wherein a pixel has a minimum lateral extent of 100 µm in a lateral direction.

6. The method according to claim 2, wherein subpixels of different types are formed by different semiconductor materials.

7. The method according to claim 2, wherein subpixels of different types have different conversion elements and are formed with the same semiconductor material.

8. The method according to claim 7, wherein the conversion elements have a thickness perpendicular to the lateral plane of at least 60 µm and of at most 100 µm.

9. The method according to claim 2, wherein the lighting device generates an illumination intensity which differs by a maximum factor of 1.5 in regions adjacent to one another.

10. The method according to claim 2, further comprising an intermediate carrier arranged between the semiconductor component and the drive circuit, wherein the semiconductor component is electrically conductively connected to the drive circuit via the intermediate carrier.

11. The method according to claim 2, further comprising an optical element, wherein the optical element directs light from subpixels of a different type of a pixel into the same region of the field of view, and wherein the optical element directs light from at least one pixel into each region.

12. The method according to claim 2, wherein the pixels are operated with a current density of at least 10 mA per mm$^2$ and a current is not pulsed.

13. The method according to claim 2, further comprising: detecting a color location of a region by the sensor; and illuminating this region with light from the same color location within a tolerance range by the lighting device.

14. The method according to claim 2, further comprising detecting a red, green and blue color component of the color location of a region by the sensor; and
illuminating this region by the lighting device with light in a red, green and/or blue wavelength range, wherein the lower a color position detected the sensor in this region, the higher an illumination intensity with light of a wavelength range of the lighting device in this region.

15. The method according to claim 14,
wherein an actual value includes an actual brightness and/or an actual color location, and
wherein a target value includes a target brightness and/or a target color location.

16. The method according to claim 2,
wherein, in the first projection, the field of view is illuminated with electromagnetic radiation in an infrared wavelength range, and in the infrared wavelength range the field of view is projected on an infrared detector, and
wherein the first actual values of the regions of the field of view are determined on basis of imaging in the infrared wavelength range.

* * * * *